United States Patent
Zheng et al.

(10) Patent No.: US 8,160,374 B2
(45) Date of Patent: Apr. 17, 2012

(54) METHOD AND APPARATUS FOR REALIZING ADAPTIVE QUANTIZATION IN PROCESS OF IMAGE CODING

(75) Inventors: Jianhua Zheng, Shenzhen (CN); Yun He, Shenzhen (CN); Jianwen Chen, Shenzhen (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 884 days.

(21) Appl. No.: 12/210,939

(22) Filed: Sep. 15, 2008

(65) Prior Publication Data
US 2009/0010557 A1    Jan. 8, 2009

Related U.S. Application Data

(63) Continuation of application No. PCT/CN2007/000863, filed on Mar. 16, 2007.

(30) Foreign Application Priority Data

Mar. 16, 2006 (CN) .......................... 2006 1 0064858

(51) Int. Cl.
G06K 9/36 (2006.01)
G06K 9/46 (2006.01)

(52) U.S. Cl. ...................................................... 382/239

(58) Field of Classification Search .................. 382/173, 382/232, 233, 238, 248, 250, 251; 375/240.03, 375/240.04, 240.14, 240.17, E7.14, E7.027, 375/E7.133, E7.134; 348/699
See application file for complete search history.

(56) References Cited

U.S. PATENT DOCUMENTS

| | | | |
|---|---|---|---|
| 5,398,078 A * | 3/1995 | Masuda et al. | 348/699 |
| 5,892,548 A * | 4/1999 | Kim | 375/240.04 |
| 6,148,109 A | 11/2000 | Boon et al. | |
| 6,256,423 B1 | 7/2001 | Krishnamurthy et al. | |
| 6,292,588 B1 | 9/2001 | Shen et al. | |

(Continued)

FOREIGN PATENT DOCUMENTS

CN        1350401 A     5/2002
(Continued)

OTHER PUBLICATIONS

Chen et al., "Macroblock-Level Adaptive Frequency Weighting for Perceptual Video Coding," *IEEE Transactions on Consumer Electronics*, 53(2): 775-781 (May 2007).

(Continued)

*Primary Examiner* — Amir Alavi
(74) *Attorney, Agent, or Firm* — Leydig, Voit & Mayer, Ltd.

(57) ABSTRACT

A method and apparatus for realizing adaptive quantization in the process of image/video coding, which includes the following steps: acquiring the parameter information of the neighbor blocks of the current block; determining the quantization mode of the current block according to the parameter information of the neighbor blocks; and performing quantization processing on transform coefficients of the current block by using the determined quantization mode. Wherein, block coding type and motion vector of the neighbor blocks are used as the parameter information for determining the quantization mode of the current block. An apparatus for adaptive quantization in process of image/video coding is provided. The invention can use different quantization mode for adaptive quantization in different image content of an image sequence, thereby improving the subjective quality of the compressed images at the same bit rate.

16 Claims, 1 Drawing Sheet

U.S. PATENT DOCUMENTS

| | | |
|---|---|---|
| 6,360,016 B1 | 3/2002 | Shen et al. |
| 6,366,703 B1 | 4/2002 | Boon et al. |
| 6,377,708 B1 | 4/2002 | Shen et al. |
| 6,532,306 B1 | 3/2003 | Boon et al. |
| 7,970,223 B2 * | 6/2011 | Sugimoto et al. ............. 382/238 |
| 7,991,237 B2 * | 8/2011 | Sekiguchi et al. ............ 382/238 |
| 2003/0036382 A1 | 2/2003 | Chen |
| 2003/0036901 A1 | 2/2003 | Chen |
| 2003/0059120 A1 | 3/2003 | Boon et al. |
| 2004/0125204 A1 | 7/2004 | Yamada et al. |
| 2004/0179595 A1 | 9/2004 | Abramov |
| 2005/0008232 A1 | 1/2005 | Shen et al. |
| 2005/0058356 A1 | 3/2005 | Shen et al. |
| 2005/0187764 A1 | 8/2005 | Chen |
| 2005/0232354 A1 | 10/2005 | Chen |
| 2007/0065027 A1 | 3/2007 | Boon et al. |
| 2007/0065028 A1 | 3/2007 | Boon et al. |
| 2007/0065029 A1 | 3/2007 | Shen et al. |
| 2007/0065030 A1 | 3/2007 | Shen et al. |
| 2007/0258519 A1 * | 11/2007 | Srinivasan ............... 375/240.03 |
| 2009/0010557 A1 * | 1/2009 | Zheng et al. .................. 382/239 |
| 2009/0034612 A1 * | 2/2009 | Zheng et al. ............. 375/240.03 |
| 2010/0080287 A1 * | 4/2010 | Ali ........................... 375/240.03 |

FOREIGN PATENT DOCUMENTS

| | | |
|---|---|---|
| CN | 1450497 A | 10/2003 |
| WO | WO 00/18131 A1 | 3/2000 |
| WO | WO 02096007 A2 | 11/2002 |
| WO | WO 2006/099229 A1 | 9/2006 |

OTHER PUBLICATIONS

Lee et al., "On the Error Distribution and Scene Change for the Bit Rate Control of MPEG," *IEEE International Conference on Consumer Electronics*, 286-287 (Jun. 1993).

Rijkse, "Draft Recommendation H.263 (Video Coding for Narrow Telecommunication Channels)," *International Telecommunication Union (ITU)—Telecommunication Standardization Sector*, Study Group 15(Document LBC-95-163):1-50 (Jun. 1995).

Weigand et al., "Rate-Constrained Coder Control and Comparison of Video Coding Standards," *IEEE Transactions on Circuits and Systems for Video Technology*, 13(7): 688-703 (Jul. 2003).

$1^{st}$ Office Action in corresponding Chinese Application No. 200780000409.1 (Sep. 25, 2009).

$1^{st}$ Office Action in corresponding European Application No. 07720440.2 (Mar. 25, 2010).

Written Opinion of the International Searching Authority in corresponding PCT Application No. PCT/CN2007/000863 (Jun. 14, 2007).

Wenger, "Test model 11," Study Group 16, Video Coding Experts Group (Question 15), Feb. 16-19, 1999, International Telecommunications Union, Monterey, California.

* cited by examiner

METHOD AND APPARATUS FOR REALIZING ADAPTIVE QUANTIZATION IN PROCESS OF IMAGE CODING

CROSS-REFERENCE TO RELATED APPLICATION

This application is a continuation of International Patent Application No. PCT/CN2007/000863, filed Mar. 16, 2007, which claims priority to Chinese Patent Application No. 200610064858.X, filed Mar. 16, 2006, each of which is hereby incorporated by reference in its entirety.

FIELD OF THE INVENTION

The present invention relates to the field of image/video coding technology, and more particularly, to a technology for deciding quantization modes in the process of image/video coding.

BACKGROUND

In image encoding and decoding technology, with respect to the process of image encoding, an image is generally partitioned into coding blocks and then subject to the encoding process. The partitioned image blocks is then transformed by an orthogonal transform to obtain corresponding block transform coefficients, and the block transform coefficients are then quantized and clipped to integers and are then subject to entropy coding to finally obtain a encoded bit stream corresponding to the image, thereby realizing the encoding process of the image.

In the architecture of video compression/coding, data feed to quantization computation during intra coding is the values of image block transform coefficients, while data feed to quantization computation during inter-coding is values of residual coefficients. Since content information of an image is completely stored in the transform coefficients or residual coefficients, quality control of compressed image may be realized by controlling quantization process in image coding process.

Images described in the present invention include static images, moving images, residual image of two adjacent images of moving images, target image obtained by performing an operation on any number of moving images, etc.

In encoding, quantization of transform coefficients is generally realized by a quantization matrix, e.g. by the following equation:

$$Q(i, j) = \left[ \frac{Coe(i, j)}{QM(i, j)} \right] \quad (1)$$

where, $Coe(i,j)$ is a value of a pixel at location $(i,j)$ after transform computation on image blocks, which is referred to as transform coefficient, $QM(i,j)$ is a quantization matrix, $Q(i,j)$ is a value of transform coefficient after quantization and truncation, which is referred as quantized coefficient value, and [•] is the truncation calculation.

Since the details of images of different contents represent different image frequencies and human eyes have different subjective feeling for different parts of an image, different quantization methods that match features of human eyes should be used for images of different contents.

At present, in image/video coding standards such as Joint Photographic Experts Group (JPEG), MPEG-1 (MPEG, Motion Picture Experts Group), MPEG-2 and MPEG-4, fixed quantization matrixes are used for quantization computation in image coding, wherein in JPEG image coding standard, the quantization matrix is stored in the image header, while in MPEG-1, MPEG-2 and MPEG-4, the quantization matrixes are stored in the sequence header. Therefore, for a sequence of images, the MPEG standard allows only one quantization matrix in sequence bit stream, that is, the whole sequence uses a same fixed quantization matrix in image quantization.

While an image is observed from human eyes, the quality evaluation of this image is made according to the subjective quality of the image perceived by human eyes, a better subjective image quality is obtained while a suitable quantization method is used for image quantization to match vision features of human eyes, i.e. for an image sequence, better subjective image quality is obtained only if appropriate quantization matrixes are selected in quantization.

However, the contents of images in a sequence are rarely identical, instead, they may vary greatly, that is, details of images in a same sequence are different from each other, and if a same quantization matrix is used in quantization for the entire sequence, the compressed images cannot achieve optimal subjective quality.

SUMMARY

Embodiments of the present invention provide a method and apparatus for implementing adaptive quantization in the process of image coding, which can improve the subjective quality of compressed images at the same bit rate.

Embodiments of the present invention provide a method for implementing adaptive quantization in the process of image coding, including:

acquiring parameter information on neighbor blocks of a current block;

determining a quantization mode for the current block according to the parameter information on the neighbor blocks; and performing quantization processing on transform coefficients of the current block with the determined quantization mode.

Embodiments of the present invention provide an apparatus for implementing adaptive quantization in the process of image coding, including:

a neighbor block parameter information acquiring unit, adapted to acquire parameter information on neighbor blocks of a current block;

a quantization mode decision unit, adapted to determine the quantization mode for the current block according to parameter information on neighbor blocks acquired by the neighbor block parameter information extractor; and a quantization processing unit, adapted to perform the quantization processing on transform coefficients of the current block with the quantization mode determined by the quantization mode decision unit.

As can be seen from the technical solution provided in embodiments of the present invention, embodiments of the present invention are implemented according to vision features of human eyes, that is, quantization processing is carried out by selecting appropriate quantization matrixes in the process of image coding. Therefore, in image coding, quantization processing on image sequence may be well adapted to content features of the image, thereby greatly improving the subjective quality of compressed images at the same bit rate.

DETAILED DESCRIPTION

Figure 1:
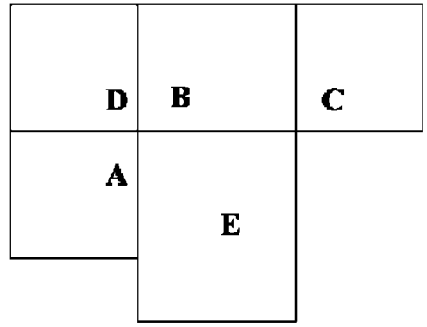
FIG. 1 is a schematic diagram showing the layout of the current block and neighbor blocks.

Quantization modes used in embodiments of the present invention include, but are not limited to, quantization matrix, quantization parameter and quantization step. The encoding and decoding of images may be performed with a determined quantization mode.

In particular, in embodiments of the present invention, corresponding quantization mode is determined according to image information, as a result, a certain extent optimal quantization mode can be obtained for each area of the image, wherein the image information includes, but is not limited to, information of image content and information generated from the image coding procedure. Therefore, the subjective quality at the same bit rate of the compressed image can be greatly improved by performing quantization calculation for image regions with the quantization mode determined in embodiments of the present invention.

The method of adaptive quantization provided in the present invention, as called as the quantization mode decision method can be embodied in the following specific implementations.

Implementation Mode 1

It may be decided whether the quantization mode used for the current block is different from that of neighbor blocks according to the block mode information on neighbor blocks of a current block, and the quality of the specifically used quantization mode is determined when it is determined to use a different quantization mode, so as to determine the quantization mode to be selected for the current block. The size of the block herein may be M×N, M, N=2, 4, 8, 16 or other sizes. The block mode information includes, but is not limited to, at least one of block size, block type, direction features of the block and block mode distribution of neighbor blocks.

Specifically, in this implementation, it may be decided, in an intra-frame or inter-frame manner, whether a different quantization mode is used for the current block according to different frame types and the block mode information of neighbor blocks of the current block. The frame types include, but are not limited to, any frame type that contains block mode information, such as I frame, P frame, and B frame.

Implementation Mode 2

It is decided whether a different quantization mode is used for current block according to the motion vector information on neighbor blocks of the current block, and the quality of the specifically used quantization mode is determined when it is determined to use a different quantization mode, so as to determine the quantization mode to be selected for the current block. The motion vector information includes, but is not limited to, motion vector magnitude, motion vector direction, and motion vector distribution of neighbor blocks.

Specifically, in the implementation 2, it may also be decided whether a different quantization mode is used for the current block according to different frame types and motion vector information on neighbor blocks of the current block. The frame types include, but are not limited to, any frame types that contain motion vector information, such as P frame and B frame.

Implementation Mode 3

The quantization mode quality used for the current block is decided according to information combining not only on neighbor blocks but also on the current block itself, and the corresponding quantization mode is further determined.

Embodiments of the present invention provide a solution for realizing quantization adapted to image content, in which different quantization modes are used for different content parts of an image sequence to greatly improve the subjective quality of compressed image at the same bit rate.

In particular, in embodiments of the present invention, the quantization mode for the current block is decided with neighbor blocks parameter information in the image coding procedure. The parameter information of neighbor blocks includes, but is not limited to, at least one of the block mode information of neighbor blocks, prediction information of neighbor blocks and motion vector information of neighbor blocks. The above information of neighbor blocks may all predict the image content features of the current block, and thus at least one of them may be used for determining the quantization mode of the current block.

With consideration of vision feature of human eyes, corresponding rules that should be followed during the decision of quantization modes for the current block include, but are not limited to, the following.

(1) For regions belonging to details of an image should be maintained as possible as enough, and the corresponding quantization mode to be used should maintain more high frequency information, that is, high quality quantization modes should be used.

(2) For regions belonging to edges of a moving part of an image, more high frequency information should be maintained, and high quality quantization modes also need to be used.

(3) For regions with rapid motion of an image, a certain decrease of objective quality would not impose great influence on subjective quality, and thus slightly rough quantization modes, i.e., low quality quantization modes may be used.

In the above three cases, different quality quantization modes may be used for characteristics of different parts of an image, wherein the high quality quantization modes and low quality quantization modes may be predefined, and meanwhile, more levels of different quality quantization modes may be set, for example, high, middle and low quality quantization matrixes may be set as quantization modes available for various current blocks. Specifically, quantization modes of multiple level quantization qualities may be first set in the system, and corresponding selection conditions for selecting a quantization mode of each level of quantization quality are set based on the parameter information of neighbor blocks or parameter information of current block and neighbor blocks, then the quantization mode to be used for the current block may be determined according to the parameter information of neighbor blocks or the parameter information of current block and neighbor blocks.

For example, for quantization matrixes of different qualities, quantization modes may be classified into the following type.

(1) Quantization Mode 0:

Default quantization mode, that is, the quantization matrix used for the current coding macroblock is same as the current default quantization mode.

(2) Quantization Mode 1:

Details-preserving mode, that is, the quantization matrix used for the current coding macroblock should be that the quantized image preserves image details as more as enough, and this quantization mode is a high quality quantization mode.

(3) Quantization Mode 2:

Undetailed quantization mode, that is, the current coding macroblock is not the details of an image and image details of the quantized image needs not to be preserved. This quantization mode is a low quality quantization mode.

Then, conditions for selecting different quantization modes are set based on block parameter information, and hence the quantization mode to be used for the current block may be selected at the encoder side and the decoder side, respectively, according to parameter information conditions.

In other words, in practical procedure of image/video coding, based on preset rules, the quantization mode for current block is decided with parameter information on neighbor blocks, that is, quantization modes of different qualities corresponding to parameter information on neighbor blocks are preset as the rules of decision. The rules to be set include: the conditions that are determined to use predetermined high quality quantization mode for the current block when the parameter information on neighbor blocks meet these conditions, as well as the condition that are determined to use predetermined low quality quantization mode for the current block when the parameter information on neighbor blocks meet these conditions, wherein the high quality quantization modes refer to quantization modes that preserve more frequency information and have high image fidelity, and the low quality quantization modes refer to quantization modes that lose some frequency information and have low image fidelity.

In addition, for different frame types, i.e. for intra-coding frames and inter-coding frames, different quantization modes decision rules need to be used. For example, in an intra-coding picture, mode information of the detailed part of image is generally more plenty than that of the undetailed part of an image, and thus, if block mode information of neighbor macroblocks (i.e. neighbor blocks) is different from each other, a higher quality quantization mode should be used for the current block. In inter-coding picture, the prediction mode of detailed parts of an image is generally much plenty than that of undetailed part of image, and block size information on neighbor blocks and mode information on neighbor blocks may be used in decision condition of quantization modes decision.

To facilitate understanding of embodiments of the present invention, specific processing of a quantization mode decision according to embodiments of the present invention will be described below, which mainly includes the following cases:

Different decision rules are used for different frame types.

For different frame types, namely intra-coding frames and inter-coding frames, the decision rules may be different. The above-mentioned neighbor macroblock is defined in FIG. 1. In case of an intra-coding picture, intra-prediction mode and block type of neighbor blocks may be used in the decision conditions. In case of inter-coding picture, inter-prediction mode (including block size and block type) and motion vector of neighbor blocks may be used in the decision conditions.

In FIG. 1, the current block is E, neighbor blocks of E are A, B, C and D. Further, block sizes of A, B, C, D, and E may be identical or may be different, wherein neighbor blocks in vertical direction of the current block E are A and D, and neighbor blocks in horizontal direction of the current block E are B and D or C and D. The neighbor blocks may be direct neighbor blocks of E or indirect neighbor blocks. The direct neighbor blocks of E are adjacent border blocks of E, and the indirect neighbor blocks are neighbor blocks of adjacent border blocks of E.

Decision for different frame types will be described below.

I. Quantization Modes Decision for Intra Coding Picture.

In this case, the current frame is an intra-coding picture such as an I frame, and corresponding quantization modes of the current block are determined with an intra-quantization mode decision. The intra-coding block refers to a block with intra-prediction mode.

Specifically, for an intra-coding picture, the prediction mode of image detail parts is more plenty than that of others and mode information on neighbor blocks is typically different. Thus, if prediction modes of neighbor blocks are different, it means that the current macroblock may be a detail region or region edges of the image, and then a high quality quantization mode that can preserve details should be used for the current macroblock. For example, in FIG. 1, a low-quality quantization mode that does not preserve details is selected for the current macroblock only when prediction mode information on neighbor blocks meets one of the following conditions.

(1) Neighbor blocks in vertical direction edge of E use identical quantization modes, e.g. blocks A and D use identical quantization modes;

(2) Neighbor blocks in horizontal direction edge of E use identical quantization modes, e.g. blocks B (or C) and D use identical quantization modes.

The identical prediction mode means that prediction modes of two blocks are the same. For example, two blocks are both of vertical prediction mode or horizontal prediction mode.

II. Quantization Modes Decision for Inter-Coding Picture.

In this case, the current frame is an inter-coding picture such as P frame, B frame, and then corresponding quantization modes of the current block are determined with an inter-quantization mode decision.

Specifically, for an inter-coding picture, the block mode information of image detailed parts is more plenty than that of others. Thus, if inter-coding modes of neighbor macroblocks are different, it means that the current macro block may be a detail region or region edge of the image, and then a high quality quantization mode that can preserve details should be used for the current macroblock. For example, in FIG. 1, a low quality quantization mode that does not preserve details may be selected for the current macro block only when prediction mode information on neighbor macroblocks meets one of the following conditions:

(1) No one in neighbor blocks A, B, C and D is of an intra-coding block;

(2) No one in neighbor blocks A, B, C and D is of a small size coding block;

(3) Neighbor blocks in vertical directions, such as A and D, are both large size coding blocks; and (4) Neighbor blocks in horizontal directions, such as B (or C) and D, are both large size coding blocks.

In addition, according to vision feature of human eyes, human eyes are not sensitive for image regions with fast motion, and thus low quality quantization modes may be used for these regions.

Further, in the neighbor blocks, each macroblock contains motion vectors itself and each motion vector contains motion vector magnitude and motion vector direction. Therefore, motion vectors of each neighbor macroblock and motion vector distribution of neighbor macroblocks may be used to estimate motion characteristics of the current coding area, and hence may be used in decision conditions for inter-coding quantization modes.

The mode information of coding blocks include, but are not limited to, information such as block size and prediction mode of the coding block. The so-called block size refers to the size of a block used for intra-frame prediction and compensation of intra-coding block or for motion compensation of inter-coding blocks, and in state-to-art video coding standards, inter-coding allows motion compensation with multiple size of blocks. The so-called small size mode coding block refers to a block used with small coding size, such as a 4×4 block, and the so-called large size mode coding block refers to a block used with large size such as a 16×16 block and SKIP block.

Quantization modes for the current block may be obtained through the above process and quantization procedure on coefficient data may be further performed.

The process of a quantization mode decision according to the invention will now be described by taking H.264/AVC standard as an example.

Different decision rules are used for different frame types.

The frame types include I frames, P frames and B frames in H.264/AVC. The above-mentioned definition of neighbor macroblocks is still as shown in FIG. 1. In an I frame, intra-prediction modes of neighbor blocks may be used in the decision conditions. In a P frame, information such as inter-prediction mode and motion vector may be used in the decision conditions for determine the quantization mode. In H.264/AVC, for a 4×4 block, the prediction mode of neighbor intra-blocks has up to 9 prediction directions. In H.264/AVC, the prediction mode of inter-coding frame supports motion compensation technology with multiple block sizes in which inter-frame prediction mode indicate the block size information, such as 16×16, 16×18, 8×8, etc.

In H.264/AVC, inter picture may have blocks with intra prediction mode. The small block size mode may refer to modes of block size 8×8 or below in H.264/AVC. The large block size mode may refer to modes of block size 8×8 or above in H.264/AVC.

Embodiments of the present invention will be described below, assuming that neighbor blocks of E are edge blocks directly adjacent to E.

I. If the current frame is I frame, intra quantization mode decision is used.

For an intra-coding image, prediction modes of image details are usually more complex than those of undetailed parts of image, and mode information on neighbor blocks is generally different. Therefore, if prediction modes of neighbor macroblocks are different, high quality quantization modes should be used. In FIG. 1, low quality quantization modes can be selected only if prediction mode information on neighbor macroblocks meets one of the following conditions:

(1) neighbor blocks in vertical edge of E have identical prediction mode, e.g. block A and D have identical modes, in which the prediction modes are identical means for example they are both of the horizontal direction prediction mode;

(2) neighbor blocks in horizontal edge of E have identical prediction mode, e.g. blocks B (or C) and D have identical modes, in which the prediction modes are identical means for example they are both of the horizontal direction prediction mode.

For FIG. 1, with reference to the above-described quantization modes 0, 1 and 2, quantization modes used for the current block E may be determined in the following decision conditions:

(1) If one of A, B, C and D is of non-directional prediction mode or average (DC) prediction mode, quantization mode 0, namely the default quantization mode, is used for E;

(2) If neighbor blocks in a vertical edge of E have the identical prediction mode, e.g. block A and D have the identical prediction mode, e.g. horizontal direction prediction mode, or neighbor blocks in horizontal edge of E have identical prediction mode, e.g. block B and D or block B and C have identical modes, quantization mode 0, namely the default quantization mode, is used for E; and (3) If A, B, C and D do not satisfy the above conditions (1) and (2), the quantization mode 1, namely the quantization mode that preserves details, is used for E.

II. If the current frame is a P frame, inter quantization mode decision is used.

In FIG. 1, low quality quantization modes can be selected only if mode information on neighbor macro blocks satisfies one of the following conditions:

(1) No one of neighbor blocks A, B, C and D are of intra-coding blocks;

(2) No one of neighbor blocks A, B, C and D are of blocks with small size prediction modes;

(3) Neighbor blocks in vertical edge of E have identical modes, e.g. A and D have identical modes, both of which are of blocks with large size prediction modes; and (4) Neighbor blocks in horizontal edge of E have identical modes, e.g. B (or C) and D have identical modes, both of which are of blocks with large size prediction modes.

Still referring to the above-mentioned three quantization modes 0, 1 and 2, in P frames, quantization mode 0 is defaulted to be used for the current block E, and quantization decision conditions for the current block E include:

(1) if one of A, B, C and D is an intra-coding block, quantization mode 1, namely the details preserved mode, is used for E;

(2) if one of A, B, C and D is a small size block, such as a 4×4 block or a 8×8 block, quantization mode 1, namely the details preserved mode, is used for E;

(3) if neighbor blocks in vertical edge and/or neighbor blocks in horizontal edges are of skip mode, for example, blocks A and D in vertical neighbor edges are of skip mode and/or blocks B (or C) and D in horizontal neighbor edge are of skip mode, which indicates that the prediction mode of the current block E may also be skip mode and indicates that the current block E just corresponds to a coding block in the previous frame but it cannot be determined whether the current block E belongs to details of the image, and thus quantization mode 0, namely the default quantization mode, is used for E; and quantization mode 1, namely the details preserved mode, is also used for E;

(4) if neighbor blocks in a vertical edge or neighbor blocks in a horizontal edge are of blocks with large block size prediction modes, for example, A and D are of block size 16×16 prediction modes or B and D are of block size 16×16 prediction modes or B and C are of block size 16×16 prediction modes, which indicates that the current block E is likely to be a undetailed region, and thus quantization mode 2, namely the quantization mode that does not preserve details, is used for E; and (5) if A, B, C and D do not satisfy the above conditions (1)-(4), the quantization mode 1, namely the quantization mode that preserves details, is used for E.

Similarly, if the current frame is a B frame, inter-quantization mode decision is also used for the current block E, and specific decision conditions are as follows:

(1) if neighbor blocks in the vertical edge and/or neighbor blocks in the horizontal edge are of skip modes, for example, blocks A and D in the vertical neighbor edge are of skip modes and/or blocks B (or C) and D in the horizontal neighbor edge are of skip modes, quantization mode 0, namely the default quantization mode, is used for E;

(2) if neighbor blocks in vertically edge and/or neighbor blocks in horizontal edge are of block size 16×16 prediction modes, for example, blocks A and D in the vertical neighbor edge are of 16×16 modes and/or blocks B (or C) and D in with the horizontally neighbor edge are of block size 16×16 prediction modes, quantization mode 2, namely the quantization mode that does not preserve details, is used for E; and (3) if A, B, C and D do not satisfy the above conditions (1) and (2), the quantization mode 1, namely the quantization mode that preserves details, is used for E.

Figure 2:
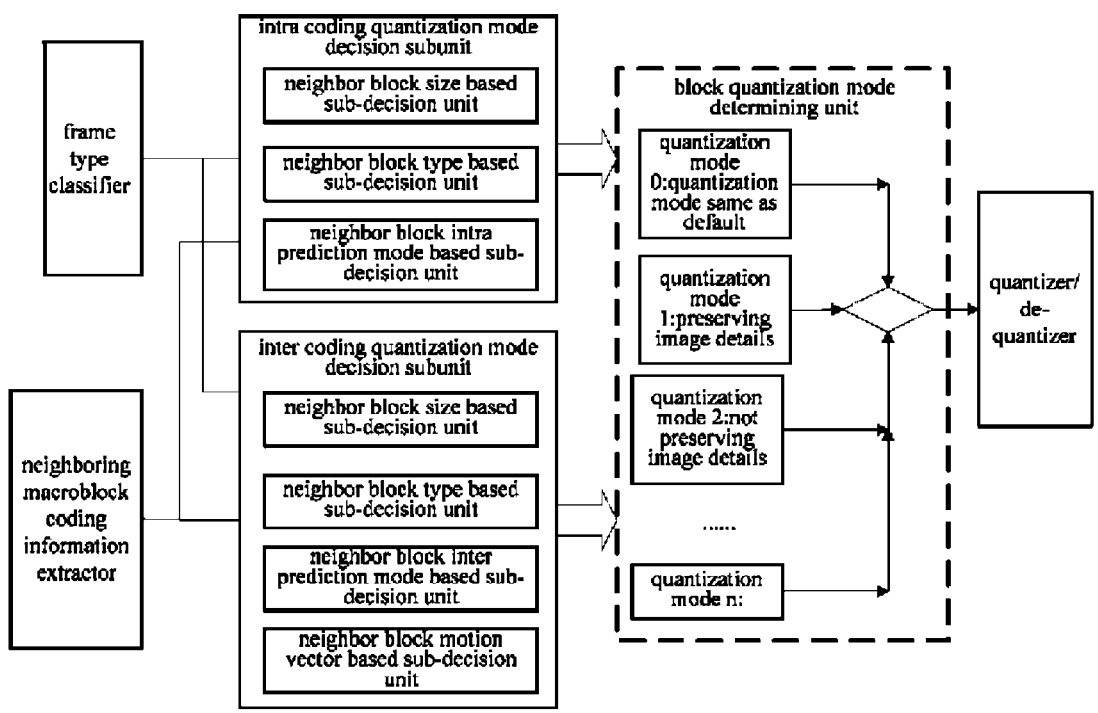
FIG. 2 is a schematic diagram showing the structure of an apparatus according to an embodiment of the present invention.

Embodiments of the present invention also provide an apparatus for realizing adaptive quantization in the procedure of image/video coding, which decides quantization modes for the current block according to coding parameter information on neighbor blocks. As shown in FIG. 2, the specific implementation structure of the apparatus includes:

a neighbor block parameter information acquiring unit, adapted to acquire parameter information on neighbor blocks of the current block, wherein the neighbor block parameter information acquiring unit is embodied as a neighbor macroblock coding information extractor;

a quantization mode decision unit, adapted to determine the quantization mode for the current block according to parameter information on neighbor blocks acquired by the neighbor block parameter information extractor; wherein the quantization mode decision unit specifically includes an intra-coding quantization mode decision subunit, an inter-coding quantization mode decision subunit, and a block quantization mode determining unit adapted to determine quantization mode of the current coding block; and a quantization processing unit, adapted to perform quantization computation on transform coefficients of the current block with the quantization mode determined by the quantization mode decision unit, wherein the quantization processing unit may specifically be a quantizer in encoder or a dequantizer in decoder.

The apparatus may also comprise a frame type classifier for acquiring the type of the current coding frame and notifying the type to the quantization mode decision unit.

Individual description of the parts specifically contained in the quantization mode decision apparatus will be given below.

The frame type classifier is adapted to acquire the type of frame which the current coding block belongs, such as I frame, P frame or B frame, and notify frame type information to the intra-coding quantization mode decision subunit and the inter-coding quantization mode decision subunit. Different frame types would have different influence on the choice of the decision subunit and the result of quantization mode decision.

The neighbor block coding information extractor is adapted to acquire parameter information on neighbor blocks of the current coding block, in which acquiring parameter information includes at least one of the block partition information of neighbor blocks, prediction information of neighbor blocks, motion vector information of neighbor blocks and information of the quantization mode used for neighbor blocks, and notify this parameter information to the intra-coding quantization mode decision subunit and the inter-coding quantization mode decision subunit in order to select different sub-decision unit in the quantization mode decision unit according to different coding parameter information of neighbor blocks.

The intra-coding quantization mode decision subunit is adapted to decide the quantization mode for the current coding block according to the frame type and the acquired intra-coding information of neighbor blocks, wherein the acquired intra-coding information may include block size, block prediction mode, direction of intra-block prediction, and quantization mode information, etc. Typically, the intra-quantization mode decision subunit may be divided into a neighbor block size based sub-decision unit, a neighbor block type based sub-decision unit and/or a neighbor block intra-prediction mode (or direction) based sub-decision unit according to the input intra-coding information of neighbor blocks.

The inter-coding quantization mode decision subunit is adapted to decide the quantization mode for the current coding block according to the frame type and the acquired inter-coding information of neighbor blocks, wherein the acquired inter-coding information may include block size, block mode, inter-prediction direction information of block, direction of block motion vector, magnitude of block motion vector, quantization mode information of neighbor blocks, etc. Typically, the inter-quantization mode decision subunit may be divided into a neighbor block size based sub-decision unit, a neighbor block type based sub-decision unit, a neighbor block inter-prediction mode (or direction) based sub-decision unit and/or a neighbor block motion vector based sub-decision unit according to the input inter-coding information of neighbor blocks.

The block quantization mode determining unit is to finally select and determine a quantization mode for the current coding block as one of several quantization modes, according to the output from the intra-coding quantization mode decision subunit or the inter-coding quantization mode decision subunit, input the determined quantization mode to the quantization processor so as to update parameter values of the quantization processor, and thus control the quantization quality of quantization processor. The quantization modes may be of various types, and typical modes may include a quantization mode that preserves image details, a quantization mode that does not preserve image details, and a quantization mode which is the same as the default quantization mode.

The operation principle of the quantization mode decision device is to select a proper quantization mode decision subunit according to frame type and coding parameter information of neighbor blocks, and (1) In case of an intra-coding image, the intra-quantization mode decision subunit is selected, and according to intra-coding information of neighbor blocks, one sub-decision unit is further selected among the neighbor block size based sub-decision unit, the neighbor block type based sub-decision unit and the neighbor block intra-prediction mode (or direction) based sub-decision unit, and then the mode decision result is output, wherein the neighbor block size based sub-decision unit is adapted to decide quantization mode according to neighbor block size information;

the neighbor block type based sub-decision unit is adapted to decide quantization mode according to neighbor block type information; and the neighbor block intra prediction mode based sub-decision unit is adapted to decide quantization mode according to neighbor block intra-prediction mode information.

(2) In case of an inter-coding image, either the intra-quantization mode decision subunit or the inter-quantization mode decision subunit is selected for current block according to the block type of the current coding block.

(21) If intra coding is used for the current block, the intra quantization mode decision subunit is used and the structure thereof may be same as (1). However, the input coding information of neighbor blocks to be used may be different from (1). When the intra-quantization mode decision subunit is used for inter-coding images, the coding parameter information on neighbor blocks may include more types, for example, sizes of neighbor blocks may include 8×8, 16×8, 8×16, and 16×16.

(22) If inter-coding is used for the current block, the inter-quantization mode decision subunit is used. Specifically, one sub-decision unit is selected among a neighbor block size based sub-decision unit, a neighbor block type based sub-decision unit, a neighbor block intra-prediction mode (or direction) based sub-decision unit, a neighbor block motion vector based sub-decision unit according to inter-coding information of neighbor blocks, and then the quantization mode decision result is output; wherein the neighbor block size based sub-decision unit is adapted to decide quantization mode according to neighbor block size information;

the neighbor block type based sub-decision unit is adapted to decide quantization mode according to neighbor block type information;

the neighbor block inter prediction mode based sub-decision unit is adapted to decide quantization mode according to neighbor block inter prediction mode information; and the neighbor block motion vector based sub-decision unit is adapted to decide quantization mode according to motion vector information on neighbor blocks.

In summary, the quantization mode decision solution provided in embodiments of the present invention has the following advantages.

With this quantization mode decision method, adaptive quantization based on macroblock size may be achieved in image coding, that is, each macroblock may have individual quantization mode.

Further, for image coding at block level, while achieving block level adaptive quantization, no quantization matrix needs to be transferred in the image level and macroblock level bit stream, which results in that no additional bit stream overhead exists for the block level.

In addition, embodiments of the present invention are implemented according to vision features of human eyes. Thus, during coding procedure, quantization computation of image sequence can be well adapted to image content, and thus subjective quality of the compressed image may be greatly improved at the same bit rate.

The above description is only preferred embodiments of the present invention, and the scope of the present invention is not limited thereto. Any variations or replacements easily occur to those skilled in the art in the technical scope disclosed by the present invention, and these variations or replacements should be covered by the scope of the present invention. Therefore, the protection scope of the present invention should be defined by the claims.

What is claimed is:

1. A method for realizing adaptive quantization in process of image coding, comprising:
acquiring parameter information on neighbor blocks of a current block;
determining a quantization mode for the current block according to the parameter information on the neighbor blocks; and
performing quantization processing on transform coefficients of the current block with the determined quantization mode.

2. The method of claim 1, wherein the parameter information comprises at least one of the following:
frame type information, block mode information on the neighbor blocks, prediction information on the neighbor blocks, motion vector information on the neighbor blocks, and information on quantization modes used by the neighbor blocks.

3. The method of claim 2, wherein the block mode information comprises at least one of the following:
a block size determined according to block partition information of block mode;
a block type determined according to the block mode type;
a block direction feature determined according to block direction information on the block mode type; and
a block mode distribution information on the neighbor blocks determined according to a spatial distribution relationship feature of block modes information on neighbor blocks.

4. The method of claim 2, wherein the motion vector information comprises at least one of the following:
motion vector magnitude, motion vector direction, and motion vector distribution of neighbor blocks.

5. The method of claim 4, wherein the step of determining the quantization mode for the current block comprises:
determining the quantization mode for the current block in intra-frame or inter-frame manner, according to the parameter information on the neighbor blocks.

6. The method of claim 5, wherein the step of determining the quantization mode for the current block comprises:
determining a quality of the quantization mode used for the current block in an intra-frame or inter-frame manner, according to the block mode information on the neighbor blocks, and further determining corresponding quantization mode; and/or
determining a quality of the quantization mode used for the current block in an intra-frame or inter-frame manner, according to the motion vector information on the neighbor blocks, and further determining corresponding quantization mode; and/or
determining, a quality of the quantization mode used for the current block in an intra-frame or inter-frame manner, according to the block mode information and the motion vector information on the current block and the neighbor blocks, and further determining corresponding quantization mode.

7. The method of claim 4, wherein the method further comprises setting different ways for selecting quantization modes corresponding to various frame types, and the step of determining the quantization mode for the current block comprises:
selecting a corresponding quantization mode for the current block according to the way for selecting quantization modes corresponding to an intra-coding image and an inter-coding image.

8. The method of claim 4, wherein the step of determining the quantization mode for the current block comprises:
determining an individual quantization mode with respective quantization quality for each image block.

9. The method of claim 4, wherein the quantization modes include quantization matrix, quantization parameter or quantization step.

10. The method of claim 4, wherein the method further comprises:
setting quantization modes with different quantization qualities, and setting selection conditions for selecting a quantization mode with each quantization quality based on corresponding neighbor blocks parameter information, or setting selection conditions for selecting a quantization mode with each quantization quality based on corresponding current block and neighbor block parameter information.

11. An apparatus for realizing adaptive quantization in process of image coding, comprising:
- a neighbor block parameter information extractor is adapted to acquire parameter information on neighbor blocks of a current block;
- a quantization mode decision unit, adapted to determine the quantization mode for the current block according to the parameter information on neighbor blocks acquired by the neighbor block parameter information extractor; and
- a quantization processing unit, adapted to perform quantization processing on transform coefficients of the current block with the quantization mode determined by the quantization mode decision unit.

12. The apparatus of claim 11, wherein the neighbor block parameter information extractor is a neighbor macroblock coding information extractor adapted to acquire parameter information on neighbor blocks of the current block and notify the quantization mode decision unit of the acquired parameter information; the parameter information includes at least one of the block mode information on the neighbor blocks, prediction information on the neighbor blocks, motion vector information on the neighbor blocks, and information on the quantization mode used for the neighbor blocks.

13. The apparatus of claim 11, wherein the apparatus further comprises a frame type classifier adapted to acquire the frame type of current coding frame in which the current coding block belongs to, and notifying the quantization mode decision unit of the frame type.

14. The apparatus of claim 13, wherein the quantization mode decision unit comprises:
- an intra-coding quantization mode decision subunit, adapted to decide the quantization mode for the current coding block, according to the frame type and the acquired intra-coding information on the neighbor blocks;
- an inter-coding quantization mode decision subunit, adapted to decide the quantization mode for the current coding block, according to the frame type and the acquired inter-coding information on the neighbor blocks; and
- a block quantization mode determining unit, adapted to select and determine the quantization mode for the current block and outputting the determined quantization mode to the quantization processing unit, according to an output of the intra-coding quantization mode decision subunit or the inter-coding quantization mode decision subunit.

15. The apparatus of claim 14, wherein the intra-quantization mode decision subunit comprises at least one of a neighbor block size based sub-decision unit, a neighbor block type based sub-decision unit and a neighbor block intra-prediction mode based sub-decision unit, wherein
- the neighbor block size based sub-decision unit is adapted to decide quantization mode according to neighbor block size information;
- the neighbor block type based sub-decision unit is adapted to decide quantization mode according to neighbor block type information; and
- the neighbor block intra-prediction mode based sub-decision unit is adapted to decide quantization mode according to neighbor block intra-prediction mode information.

16. The apparatus of claim 15, wherein the inter-quantization mode decision subunit comprises a neighbor block motion vector based sub-decision unit, wherein
- the neighbor block motion vector based sub-decision unit is adapted to decide quantization mode according to motion vector information on neighbor blocks.

* * * * *